(12) United States Patent
Sung (10) Patent No.: US 7,323,049 B2
(45) Date of Patent: Jan. 29, 2008

(54) HIGH PRESSURE SUPERABRASIVE PARTICLE SYNTHESIS

(76) Inventor: Chien-Min Sung, 4, Lane 32, Chung-Cheng Road, Tansui, Taipei County 251 (TW)

( * ) Notice: Subject to any disclaimer, the term of this patent is extended or adjusted under 35 U.S.C. 154(b) by 266 days.

(21) Appl. No.: 10/791,300

(22) Filed: Mar. 1, 2004

(65) Prior Publication Data

US 2004/0194689 A1    Oct. 7, 2004

Related U.S. Application Data

(63) Continuation-in-part of application No. 10/259,168, filed on Sep. 27, 2002, now Pat. No. 7,124,753, which is a continuation-in-part of application No. 09/935,204, filed on Aug. 22, 2001, now Pat. No. 6,679,243, which is a continuation-in-part of application No. 09/399,573, filed on Sep. 20, 1999, now Pat. No. 6,286,498, which is a continuation-in-part of application No. 08/832,852, filed on Apr. 4, 1997, now abandoned.

(51) Int. Cl.
*B28D 1/02*   (2006.01)
*B28D 11/00*  (2006.01)
*C30B 29/04*  (2006.01)

(52) U.S. Cl. .................. 117/79; 51/297; 117/929; 125/12; 423/446; 451/527

(58) Field of Classification Search .......... 51/297, 51/298, 307, 308, 293; 423/446; 117/103, 117/79, 929, 4, 7, 902; 125/12, 16.02, 21, 125/22; 451/527, 529, 533, 577; 76/DIG. 12; 419/11, 45

See application file for complete search history.

(56) References Cited

U.S. PATENT DOCUMENTS 2,876,086 A    3/1959    Raymond (Continued)

FOREIGN PATENT DOCUMENTS

JP         06182184 A  *  7/1994
WO      WO98/45092        3/1998

OTHER PUBLICATIONS

Sung, James C., "The Eastern Wind of Diamond Synthesis," New Diamond and Frontier Carbon Technology, vol. 13, No. 12003.

*Primary Examiner*—Timothy V. Eley
(74) *Attorney, Agent, or Firm*—Thorpe North & Western LLP (57) ABSTRACT

An improved method for controlling nucleation sites during superabrasive particle synthesis can provide high quality industrial superabrasive particles with high yield and a narrow size distribution. The synthesis method can include forming a raw material layer, forming a particulate catalyst layer adjacent the raw material layer, and placing crystalline seeds in a predetermined pattern at least partially in the catalyst layer or raw material layer to form a growth precursor. Alternatively, the raw material and catalyst material can be mixed to form a particulate crystal growth layer and then placing the crystalline seeds in a predetermined pattern in the growth layer. Preferably, seeds can be substantially surrounded by catalyst material. The growth precursor can be maintained at a temperature and pressure at which the superabrasive crystal is thermodynamically stable for a time sufficient for a desired degree of growth. The crystalline seeds can be placed in a predetermined pattern using a template, a transfer sheet, vacuum chuck or similar techniques. The superabrasive particles grown using the described methods typically have a high yield of high quality industrial particles and a narrow distribution of particle sizes.

29 Claims, 6 Drawing Sheets

U.S. PATENT DOCUMENTS

| | | | | |
|---|---|---|---|---|
| 2,947,608 | A | 8/1960 | Hall | |
| 4,273,561 | A | 6/1981 | Fernandez-Moran Villalobos | |
| 4,287,168 | A * | 9/1981 | Wentorf, Jr. et al. | 423/446 |
| 4,547,257 | A * | 10/1985 | Iizuka et al. | 117/79 |
| 4,551,195 | A | 11/1985 | Iizuka et al. | |
| 4,610,699 | A | 9/1986 | Yazu et al. | |
| 4,617,181 | A * | 10/1986 | Yazu et al. | 423/446 |
| 4,632,817 | A * | 12/1986 | Yazu et al. | 423/446 |
| 4,680,199 | A | 7/1987 | Vontell et al. | |
| 4,749,514 | A * | 6/1988 | Murakami et al. | 252/500 |
| 4,925,457 | A | 5/1990 | deKok et al. | |
| 4,927,619 | A * | 5/1990 | Tsuji | 423/446 |
| 5,049,165 | A | 9/1991 | Tselesin | |
| 5,194,070 | A * | 3/1993 | Sumiya et al. | 51/293 |
| 5,273,730 | A * | 12/1993 | Yoshida et al. | 423/446 |
| 5,328,548 | A * | 7/1994 | Tsuji et al. | 117/79 |
| 5,380,390 | A | 1/1995 | Tselesin | |
| 5,443,032 | A | 8/1995 | Vichr et al. | |
| 5,454,343 | A * | 10/1995 | Eun et al. | 117/1 |
| 5,772,756 | A * | 6/1998 | Davies et al. | 117/79 |
| 5,980,852 | A * | 11/1999 | Burns et al. | 423/446 |
| 5,980,982 | A * | 11/1999 | Degawa et al. | 427/185 |
| 6,001,174 | A * | 12/1999 | Fang | 117/89 |
| 6,030,595 | A * | 2/2000 | Sumiya et al. | 423/44 |
| 6,159,286 | A * | 12/2000 | Sung | 117/79 |
| 6,286,498 | B1 | 9/2001 | Sung | |
| 6,497,853 | B1 * | 12/2002 | Davies et al. | 423/446 |
| 6,616,725 | B2 | 9/2003 | Cho et al. | |
| 6,627,168 | B1 * | 9/2003 | Ohtsubo et al. | 423/290 |
| 6,835,365 | B1 * | 12/2004 | Davies et al. | 423/446 |
| 6,979,357 | B2 * | 12/2005 | Fries et al. | 51/307 |

* cited by examiner

HIGH PRESSURE SUPERABRASIVE PARTICLE SYNTHESIS

PRIORITY INFORMATION

This application is a continuation-in-part of U.S. patent application Ser. No. 10/259,168, filed Sep. 27, 2002, now U.S. Pat. No. 7,124,753, which is a continuation-in-part of U.S. patent application Ser. No. 09/935,204, filed Aug. 22, 2001, now issued as U.S. Pat. No. 6,679,243, which is a continuation-in-part of U.S. patent application Ser. No. 09/399,573, filed Sep. 20, 1999, now issued as U.S. Pat. No. 6,286,498, which is a continuation-in-part of U.S. patent application Ser. No. 08/832,852, filed Apr. 4, 1997, now abandoned, all of which are incorporated herein by reference.

FIELD OF THE INVENTION

The present invention relates generally to methods of synthesizing superabrasive particles, wherein crystalline seeds can be arranged in a predetermined pattern. Accordingly, the present invention involves the fields of chemistry, metallurgy, and materials science.

BACKGROUND OF THE INVENTION

Diamond and cubic boron nitride (cBN) particles have found widespread use as superabrasives in a variety of abrading and cutting applications. The worldwide consumption of diamond particles currently exceeds 400 metric tons. Common tools which incorporate superabrasive particles include cutting tools, drill bits, circular saws, grinding wheels, lapping belts, polishing pads, and the like. Among diamond superabrasives, saw diamond has the largest particle size at about 18 to 60 mesh, i.e. 1 mm to 0.25 mm. High quality saw diamonds are generally euhedral having fully grown crystallographic faces. Further, high quality saw diamond should have very few defects or inclusions. Standard applications for saw diamonds require high quality diamonds. This is at least partially due to the high impact force encountered during cutting, particularly at high speeds. In contrast, smaller diamond particles, i.e. 60 to 400 mesh or 0.25 mm to 37 µm, such as those used in grinding wheels, create scratches in the surface which gradually removes material from a workpiece. In such grinding applications, the impact force is typically much less than for cutting applications. Thus, commercially satisfactory smaller diamonds can be produced with less concern for flaws and impurities than is generally acceptable for larger diamonds such as saw diamonds.

Superabrasives are typically formed under ultrahigh pressure, e.g., about 5.5 GPa and high temperature, e.g., 1300° C. The worldwide consumption of superabrasives is estimated to be over 600 tons in 2003, with cBN accounting for about 10%. Under ultrahigh pressure conditions during crystal growth, the pressure tends to continually decay due to the volume contraction associated with diamond formation. Further, temperatures within the growth regions can increase due to increases in electrical resistance associated with the diamond formation. Hence, it is very difficult to maintain optimal conditions of pressure and temperature for homogeneous growth of diamond grits. Saw diamond grits are typically grown under ultrahigh pressure over a much longer time, e.g., 40 minutes than that required to grow smaller grinding grits, e.g., about 1 minute. Consequently, saw diamond grits are very difficult to grow, particularly those having high quality. Saw grits with high impact strength are characterized by a euhedral crystal shape and very low inclusions of either metal or graphite. Hence, very tight controls of pressure and temperature are required over extended periods of time to produce high quality diamonds. These difficulties partially account for the abundance of companies which can grow saw grits, while very few companies are capable of growing high grade saw grits having larger sizes.

Typical methods for synthesizing larger high quality diamonds involve ensuring uniformity of raw materials such as graphite and metal catalyst and carefully controlling process temperature and pressures. High pressure high temperature (HPHT) processes used in diamond growth can employ reaction volumes of over 200 $cm^3$. Most often, the graphite to diamond conversion in the reaction volume can be up to about 30%. Unfortunately, typical processes also result in the crystals having external flaws, e.g., rough surfaces, and undesirable inclusions, e.g., metal and carbon inclusions. Therefore, increased costs are incurred in segregating acceptable high strength diamonds from weaker, poor quality diamonds.

One major factor to consider in diamond synthesis of high grade saw diamonds is providing conditions such that nucleation of diamond occurs uniformly and nearly simultaneously. Random nucleation methods typically allow some regions of raw materials to be wasted while other regions are densely packed with diamond crystals having a high percentage of defects. Some diamond synthesis methods have improved nucleation uniformity somewhat; however, during diamond growth local changes in pressure can occur. If heating is accomplished by passing electrical current directly through the reaction cell, then diamond growth can also interfere with the electrical current used to control heating. The results of such interference are non-uniformities and fluctuations in the temperature and pressure gradients across the reaction cell and thus a wide distribution of crystal sizes, crystal shapes, and inclusion levels. Despite these difficulties, by providing highly homogeneous starting materials and carefully controlling process conditions, the volume efficiency of the reaction cell is still typically less than 2 to 3 carats per cubic centimeter. This marginal yield still wastes large amounts of raw materials, reduces production efficiencies, and leaves considerable room for improvement.

Figure 9:
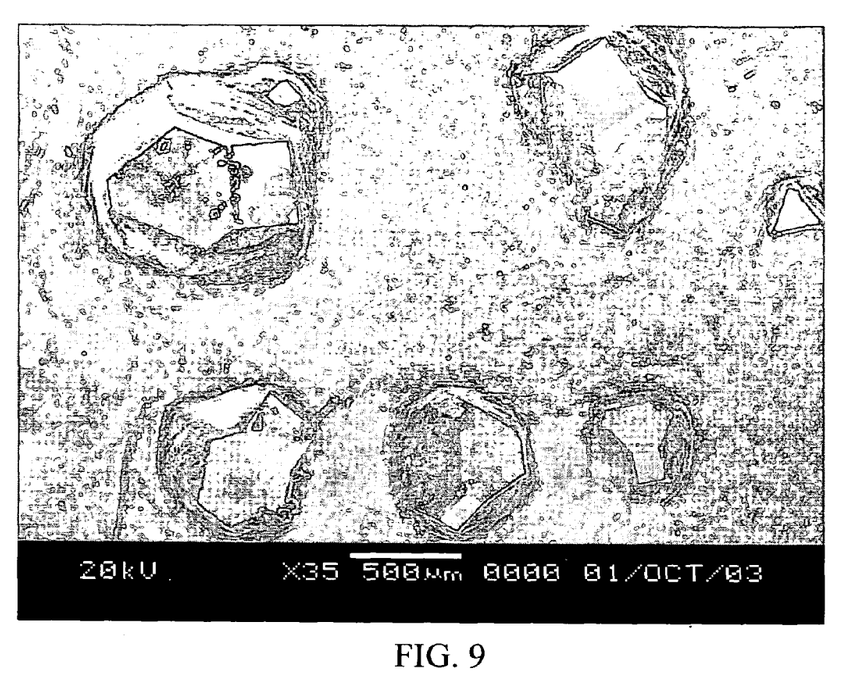
FIG. 9 is a photomicrograph of a conventional diamond assembly grown from an alternating plate method which highlights the non-uniform size distribution and non-uniform crystal shapes.

Other methods for synthesizing large industrial diamond particles include forming layers of solid disks of graphite and/or catalyst. Diamond nucleation then occurs at the interface between graphite and catalyst layers. However, such materials are intrinsically heterogeneous. For example, the firing temperature for graphite rods that are cut into disks can vary from region to region, thus affecting the microstructure and composition of the disk. Further, during mechanical formation of graphite into a rod, the graphite microstructure can change, e.g., the outer regions exhibit a skin effect during extrusion. As a result, graphite disks tend to have regions which vary in porosity, degree of graphitization, ash content, and the like. Similarly, catalyst disks have varying alloy composition as metal atoms and crystal structure tend to segregate during cooling. Additionally, during extrusion and mechanical forming processes the alloy composition in various regions changes even further. As a result, local concentrations and properties of graphite and catalyst metals can vary by several percent across solid disks. Diamonds grown under such conditions tend to nucleate at different times and experience varying growth rates, thus producing diamonds having a wide size distribution and increasing the number of flawed diamonds due to intergrowth, overgrowth, i.e. fast growth rates, and uneven growth, i.e. asymmetric growth, as shown in FIG. 9.

Figure 10:
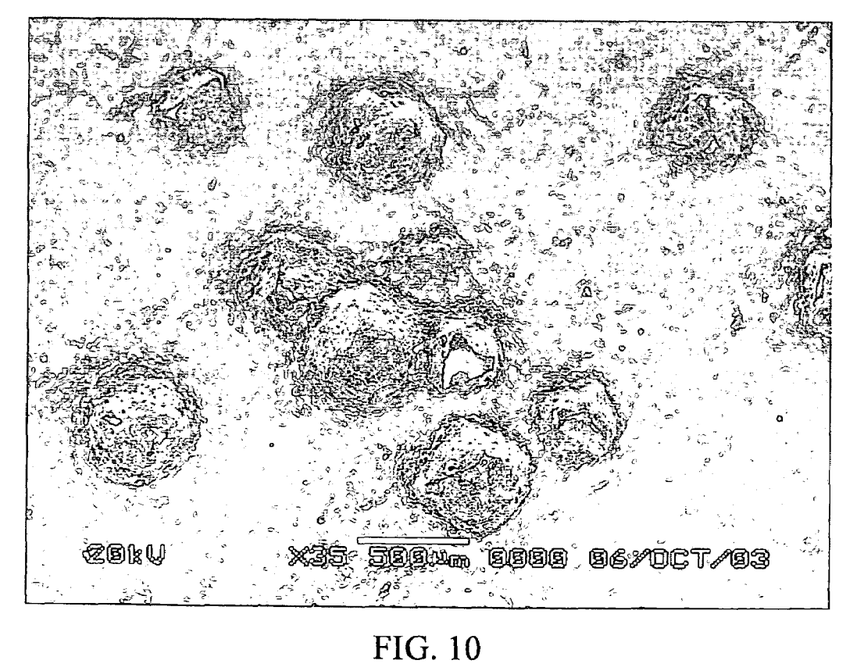
FIG. 10 is a photomicrograph of a diamond assembly grown using known powdered methods which show some improvement over conventional methods, however still suffer from somewhat non-uniform size distributions and non-uniform crystal shapes.

Recently, efforts have been made in using powdered materials to further increase yields of industrial diamond particles. These methods attempt to uniformly mix graphite and catalyst powders to achieve improved diamond nucleation. However, diamond nucleation still occurs randomly, i.e. broad size distribution, but somewhat uniformly throughout the powder under HPHT conditions, as shown in FIG. 10. Such methods have met with some success and have resulted in improved yields of up to 3 carat/cm$^3$. Further, yields of high quality diamond of specific sizes have also improved up to five times over those achievable using conventional layered disk methods. However, powdered mixture methods can be difficult to control. For example, the density of graphite and metal catalyst materials differ significantly, making uniform mixing very difficult. In addition, powdered mixture methods generally require even more strict control of process conditions than in layered methods.

Therefore, methods which further increase the quality and yields of large diamond particles suitable for commercial use continue to be sought through research and development.

SUMMARY OF THE INVENTION

It has been recognized by the inventor that it would be advantageous to develop a method for synthesizing superabrasive particles which provides high quality industrial superabrasive particles with a high yield and narrow size distribution.

In one aspect, the present invention resolves the problems set forth above by providing a method for controlling nucleation sites during superabrasive synthesis. The above method can include forming a raw material layer, forming a particulate catalyst layer adjacent the raw material layer, and placing crystalline seeds in a predetermined pattern at least partially in at least one of the catalyst layer and the raw material to form a growth precursor. Preferably, crystalline seeds can be substantially surrounded by catalyst material. In one alternative embodiment, the crystalline seeds can be coated with a catalyst metal if placed in the raw material layer.

The method of the present invention can be applied to formation of superabrasives such as diamond and cubic boron nitride (cBN). In either case, the crystalline seed can be diamond seed, cBN seed, SiC seed, or combinations thereof.

In one detailed aspect, the catalyst layer can consist essentially of catalyst material. Suitable catalyst materials for diamond synthesis can include carbon solvents such as Fe, Ni, Co, Mn, Cr, and alloys thereof. Alloys of iron and nickel have proven useful in connection with the present invention and are readily commercially available. Catalyst materials suitable for cBN synthesis can include alkali, alkali earth metal, and compounds thereof.

The composition of the raw material layer can depend on the type of superabrasive being synthesized. Diamond synthesis typically involves using a carbon source layer. In another detailed aspect of the present invention, the carbon source layer can be primarily graphite. Further, in accordance with the present invention, the degree of graphitization can preferably be greater than 0.50. The carbon source layer can be formed as a particulate layer or as a solid plate of graphite. Similarly, the raw material layer suitable for cBN synthesis can be a hexagonal boron nitride source layer.

In another aspect of the present invention, the growth precursor can include a plurality of alternating raw material and catalyst layers. Depending on the reaction volume of the HPHT apparatus used, the number of layers can vary from a single layer to thirty layers or more. In yet another detailed aspect, the growth precursor can include a plurality of particulate catalyst layers each having a plurality of crystalline seeds placed in a predetermined pattern. These predetermined patterns can involve crystalline seeds of different sizes or type. Further, the predetermined pattern can involve crystalline seed placement within each layer and specific patterns with respect to patterns of crystalline seeds among layers, which patterns can differ from layer to layer.

Appropriate growth conditions can be maintained using any number of known HPHT apparatuses such as, but not limited to, belt apparatus, cubic press, toroidal apparatus, sliding anvils, split sphere, split die, and the like. Using such devices, the growth precursor can be maintained at a temperature and pressure at which diamond or cBN is thermodynamically stable for a time sufficient for growth of the superabrasive. Advantageously, placing the crystalline seeds at least partially in a particulate catalyst layer provides highly uniform growth conditions which are less demanding than is required in typical synthesis processes. Thus, the placement of crystalline seeds in a predetermined pattern helps to improve uniformity of crystal growth, nucleation times, and reduces intergrowth of crystals and non-growing regions, while providing a particulate catalyst layer aids in increasing uniformity of crystalline growth with few defects.

In accordance with yet another aspect of the present invention, the crystalline seeds can be placed in a predetermined pattern using any number of methods. One method involves placing a template having a pattern of apertures upon the catalyst layer. Each of the apertures can be configured to receive a single crystalline seed. The apertures can then be filled with the crystalline seeds. The crystalline seeds can then be pressed at least partially into the catalyst layer. The template can optionally be removed either before or after pressing the crystalline seeds into the catalyst layer.

In an alternative embodiment, a transfer sheet can be used to place the crystalline seeds in a predetermined pattern on the catalyst layer. In still another alternative embodiment, a vacuum chuck can be used to orient and place the crystalline seeds in the predetermined pattern.

The grown superabrasives of the present invention have a high yield of high quality diamond particles and a narrow distribution of diamond sizes. Typically, yields of diamond particles can range from about 30% to about 80% conversion of carbon to diamond can be expected. Further, the percent of high quality diamond can range from 50% to about 90% of the total yield. As a further example of the effectiveness of the present invention, the grown diamonds of the present invention can have a narrow size distribution with a standard deviation less than half of conventional methods described above. Also, the grown diamonds of the present invention can have significantly fewer inclusions.

There has thus been outlined, rather broadly, various features of the invention so that the detailed description thereof that follows may be better understood, and so that the present contribution to the art may be better appreciated. Other features of the present invention will become more clear from the following detailed description of the invention, taken with the accompanying claims, or may be learned by the practice of the invention.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

A. Definitions

In describing and claiming the present invention, the following terminology will be used.

The singular forms "a," "an," and "the" include plural referents unless the context clearly dictates otherwise. Thus, for example, reference to "a matrix material" includes reference to one or more of such materials, and reference to "an alloy" includes reference to one or more of such alloys.

As used herein, "particulate" when used with respect to layers indicates that the layer is formed of particulates. Typically, particulate layers of the present invention can be loose powder, packed powder, or compacted powder having substantially no sintered particles. These particulate layers can be porous or semi-porous compacts. Compacted particulate layers can be formed using any known compaction process such as, but not limited to, wet or dry cold compaction such as cold isostatic pressing, die compacting, rolling, injection molding, slip casting, and the like. The particulate materials used in the present invention such as graphite and metal catalyst powders can be preferably handled and stored in an inert environment in order to prevent oxidation and contamination.

As used herein, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "predetermined pattern" refers to a non-random pattern that is identified prior to formation of a precursor, and which individually places or locates each crystalline seed in a defined relationship with the other crystalline seeds. For example, "placing diamond seeds in a predetermined pattern" would refer to positioning individual particles at specific non-random and pre-selected positions. Further, such patterns are not limited to uniform grid or offset honeycomb patterns but may include any number of configurations based on the growth conditions and materials used.

As used herein, "uniform grid pattern" refers to a pattern of diamond particles that are evenly spaced from one another in all directions.

As used herein, "substrate" refers to a solid metal material. While many solid metal materials may be a product of metal particulate sintering or consolidation, it is to be understood, that as used herein, "substrate" does not include powdered or particulate metal materials that have not yet been sintered or consolidated into a solid mass or form.

As used herein, "alloy" refers to a solid or liquid solution of a metal with a second material, said second material may be a non-metal, such as carbon, a metal, or an alloy which enhances or improves the properties of the metal.

As used herein, "crystalline seeds" refer to particles which serve as a starting material for growth of a larger crystalline particle. As used herein, crystalline seeds typically include diamond seeds, cBN seeds, and SiC seeds. For example, growth of superabrasive diamond is commonly achieved using diamond seeds; however cBN and/or SiC seeds can also be used to grow superabrasive diamond. Similarly, cBN can be grown using diamond, cBN, and/or SiC seeds.

As used herein, "diamond seeds" refer to particles of either natural or synthetic diamond, super hard crystalline, or polycrystalline substance, or mixture of substances and include but are not limited to diamond, polycrystalline diamond (PCD). Diamond seeds are used as a starting material for growing larger diamond crystals and help to avoid random nucleation and growth of diamond.

As used herein, "superabrasive particles" refers to particles suitable for use as an abrasive and include diamond and cBN particles.

As used herein, "precursor" refers to an assembly of crystalline seeds, particulate catalyst layer, and a raw material layer. A precursor describes such an assembly prior to the HPHT growth process. Such unsintered precursors are sometimes referred to as a "green body."

As used herein, "plate" refers to a mass of material which is partially sintered, completely sintered, or non-porous crystalline in structure. This is in distinction to a compact or pressed powder which includes particulates which are substantially unsintered. Plates can typically be circular or disk shaped; however, other shapes which are functional can also be used, e.g., square.

As used herein, "degree of graphitization" refers to the proportion of graphite which has graphene planes having a theoretical spacing of 3.354 angstroms. Thus, a degree of graphitization of 1 indicates that 100% of the graphite has a basal plane separation ($d_{(0002)}$) of graphene planes, i.e. with hexagonal network of carbon atoms, of 3.354 angstroms. A higher degree of graphitization indicates smaller spacing of graphene planes. The degree of graphitization, G, can be calculated using Equation 1.

$$G = (3.440 - d_{(0002)})/(3.440 - 3.354) \quad (1)$$

Conversely, $d_{(0002)}$ can be calculated based on G using Equation 2.

$$d_{(0002)} = 3.354 + 0.086(1 - G) \quad (2)$$

Referring to Equation 1, 3.440 angstroms is the spacing of basal planes for amorphous carbon ($L_c = 50$ Å), while 3.354 angstroms is the spacing of pure graphite ($L_c = 1000$ Å) that may be achievable by sintering graphitizable carbon at 3000° C. for extended periods of time, e.g., 12 hours. A higher degree of graphitization corresponds to larger crystallite sizes, which are characterized by the size of the basal planes ($L_a$) and size of stacking layers ($L_c$). Note that the size parameters are inversely related to the spacing of basal planes. Table 1 shows crystallite properties for several common types of graphite.

TABLE 1

| Graphite Type | $d_{(002)}$ | $L_a$ (Å) | $L_c$ (Å) | $I_{112}/I_{110}$ |
| --- | --- | --- | --- | --- |
| Natural | 3.355 | 1250 | 375 | 1.3 |
| Low Temp (2800° C.) | 3.359 | 645 | 227 | 1.0 |
| Electrode | 3.360 | 509 | 184 | 1.0 |
| Spectroscopic | 3.362 | 475 | 145 | 0.6 |
| High Temp (3000° C.) | 3.368 | | 400 | 0.9 |
| Low Ash | 3.380 | 601 | 180 | 0.8 |
| Poor Natural | 3.43 | 98 | 44 | 0.5 |

As used herein, "aperture" refers to an opening through a template surface which has a predetermined size and shape depending on the intended application. For example, the aperture size may be designed to accommodate a plurality of crystalline seeds of a given mesh size. However, it is most often desirable to design the apertures such that only one crystalline seed is accommodated by each aperture.

As used herein, "inclusion" refers to formation of carbon or metal deposits instead of diamond at the interface between a growth surface of the diamond and the surrounding material. Inclusions are most often formed by the presence of substantial amounts of carbon at the growth surface of the diamond and/or inadequate control of temperature and pressure conditions during HPHT growth. Similar inclusions and defects can also be formed during cBN synthesis.

As used herein, "euhedral" means idiomorphic or a crystal having an unaltered natural shape containing natural crystallographic faces.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

B. The Invention

Reference will now be made to the drawings in which the various elements of the present invention will be given numeral designations and in which the invention will be discussed. It is to be understood that the following description is only exemplary of the principles of the present invention, and should not be viewed as narrowing the appended claims.

The present invention includes a method for controlling nucleation sites during superabrasive particle synthesis. Generally, the methods of the present invention can be used to form either diamond or cBN superabrasive particles from corresponding crystalline seeds. In one aspect of the present invention, a raw material layer can be formed, which layer is discussed in more detail immediately below. Further, a particulate catalyst layer can be formed adjacent the raw material layer. A plurality of crystalline seeds can then be placed in a predetermined pattern at least partially in at least one of the catalyst layer and the raw material layer to form a growth precursor.

Figure 1:
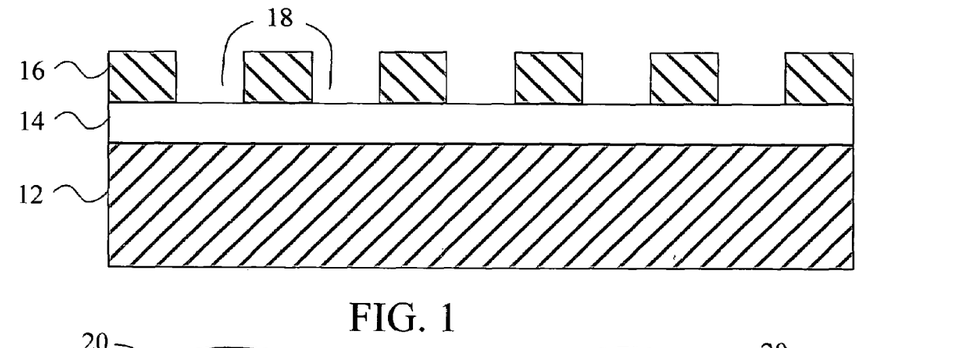
FIG. 1 is a side view of a raw material layer and particulate catalyst layer having a template thereon in accordance with an embodiment of the present invention.

Referring now to FIG. 1, a raw material layer 12 can be formed. The raw material layer can be provided as a particulate layer or as a solid plate. In one aspect of the present invention, the raw material layer can be a particulate layer. In one embodiment of the present invention, the raw material layer can be provided as a loose powder. The loose powder can be placed in a mold and optionally pressed using any known pressing technique. For example, the powder can be pressed using cold isostatic pressing at about 200 MPa to achieve a porosity of from about 8% to about 15%, although porosities of less than about 30% are typically satisfactory. Using particulate layers can provide ease of planting crystalline seeds therein and avoid formation of large voids around the crystalline seeds.

The raw material layer can include any materials which are capable of providing raw materials for growth of a desired superabrasive particle. Specifically, a carbon source can be used for diamond growth, while a low pressure-phase boron nitride such as hexagonal boron nitride can be used for cBN growth. Under diamond growth conditions, the carbon source layer can comprise a carbon source material such as graphite, amorphous carbon, diamond powder, and the like. In one aspect of the present invention, the carbon source layer can comprise graphite. Although a variety of carbon source materials can be used, graphite generally provides good crystal growth and improves homogeneity of the grown diamonds. When graphite is used as the carbon source material, preferably the carbon source material comprises at least about 85 wt % graphite. For embodiments wherein the graphite is formed as a particulate layer, suitable graphite powder can typically be from about 1 µm to about 1 mm. In one detailed aspect of the present invention, the graphite can have a degree of graphitization of greater than 0.50. Preferably, the graphite can have a degree of graphitization of from about 0.75 to about 1, and most preferably from about 0.85 to about 1. Experiments have shown that a higher degree of graphitization corresponds to larger crystallite sizes and improved grown diamond quality and uniformity. Diamond is typically formed through puckering and bending of graphene planes in the presence of molten catalyst metal. Therefore, diamond formation can be improved by providing graphite having a high degree of graphitization.

In another aspect of the present invention, a particulate catalyst layer 14 can be formed adjacent the raw material layer 12. The particulate catalyst layer can be formed of metal catalyst powder. The metal catalyst layers of the present invention can be formed as a loose powder, porous compact or other substantially non-sintered mass. Loose powder can be used directly by placing the powder in a suitable mold adjacent to the raw material layer. This loose powder can be optionally pressed using known pressing technologies to form a disk. Alternatively, the metal catalyst powder can be formed into a disk and then subsequently placed adjacent the raw material layer.

In a preferred embodiment, the particulate catalyst layer contains no binder, no oils, and no organic materials. Further, the particulate catalyst layers of the present invention can consist essentially of metal catalyst powder. The presence of organic materials during the growth process can cause undesirable flaws and non-uniformities in the grown superabrasive crystal structures. Providing a particulate catalyst layer allows for crystalline seeds to be easily embedded in the catalyst layer, as described in more detail below. Care should be taken when handling such particulate layers, since the absence of organic binders and the like tends to make the assemblies and disks more brittle than if an organic binder was included. Therefore, in some embodiments of the present invention, it can be desirable to use a solid plate as the raw material layer to provide additional mechanical support to the assembly. In an optional embodiment, raw material layers and catalyst layers can be pressed together to form a convenient supply of two-layer assemblies for use in the methods of the present invention. In one aspect of the present invention, the particulate catalyst layer can have a porosity of less than about 33%.

In one detailed aspect of the present invention, the catalyst layer can comprise a catalyst material which is suitable for growth of the desired superabrasive particle. Catalyst materials suitable for diamond synthesis can include metal catalyst powder comprising any metal or alloy which is a carbon solvent capable of promoting growth of diamond from carbon source materials. Non-limiting examples of suitable metal catalyst materials can include Fe, Ni, Co, Mn, Cr, and alloys thereof. Several common metal catalyst alloys can include Fe—Ni, e.g., INVAR alloys, Fe—Co, Ni—Mn—Co, and the like. Currently preferred metal catalyst materials are Fe—Ni alloys, such as Fe-35Ni, Fe-31Ni-5Co, Fe-30Ni, and other INVAR alloys, with Fe-35Ni being most preferred and more readily available. In addition, the catalyst materials under diamond synthesis can include additives which control the growth rate of diamond, i.e. via suppressing carbon diffusion, and also prevent excess nitrogen and/or oxygen from diffusing into the diamond. Suitable additives can include Mg, Ca, Si, Mo, Zr, Ti, V, Nb, Zn, Y, W, Cu, Al, Au, Ag, Pb, B, Ge, In, Sm, and compounds of these materials with C and B.

Similarly, catalyst materials suitable for cBN synthesis can include any catalyst capable of promoting growth of cBN from suitable boron nitride raw materials. Non-limiting examples of suitable catalyst materials for cBN growth include alkali metals, alkali earth metals, and compounds thereof. Several specific examples of such catalyst materials can include lithium, calcium, magnesium, nitrides of alkali and alkali earth metals such as $Li_3N$, $Ca_3N_2$, $Mg_3N_2$, $CaBN_2$, and $Li_3BN_2$. The catalyst materials under cBN synthesis can further include very minor amounts of additives which control the growth rate of cBN crystal such as Si, Mo, Zr, Ti, Al, Pt, Pb, Sn, B, C, and compounds of these materials with Si, B, and N.

Dimensions of the particulate catalyst layer 14 can vary considerably. However, the thickness of the layer should allow raw material such as carbon to diffuse toward the crystalline seeds sufficient to allow crystal growth at an interface between the crystalline seeds and the surrounding catalyst material. In one aspect of the present invention, the raw material layer and/or particulate catalyst layer can be formed by cold pressing powder to form a coherent mass which is then sliced into thin layers such as a disk for use in the present invention. The pressed disks can then be stored for later use and can be easily placed in a mold as described above.

Figure 3:
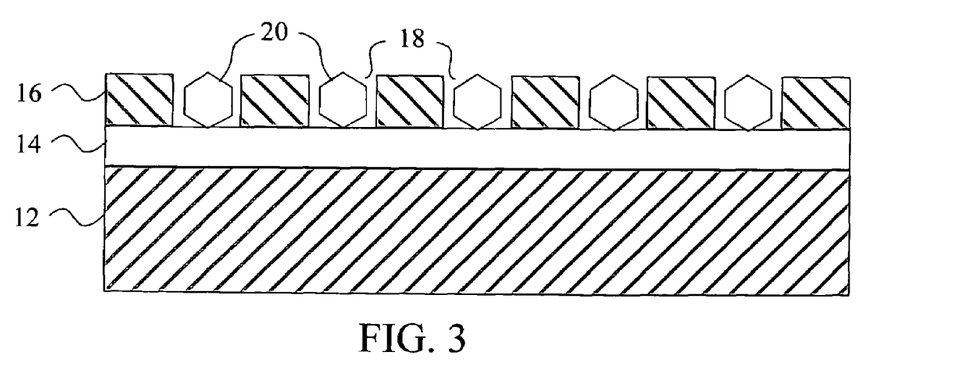
FIG. 3 is a side view of the assembly of FIG. 1 having crystalline seeds placed in a predetermined pattern in accordance with an embodiment of the present invention.

Referring now to FIG. 3, in accordance with the present invention, crystalline seeds can be placed in a predetermined pattern in the particulate catalyst layer 14. By placing crystalline seeds in a regular predetermined pattern, growth conditions can be optimized to efficiently use available growth volumes, increase crystal quality, and decrease size distribution of grown superabrasive particles. The crystalline seeds can be any suitable seed material upon which growth can occur for either diamond or cBN. In one aspect of the present invention, the crystalline seeds can be diamond seeds, cBN seeds, or SiC seeds. The synthesis of either diamond or cBN can utilize such crystalline seeds. Frequently, diamonds seeds are the preferred crystalline seeds for diamond synthesis. Further, in some embodiments of cBN synthesis, cBN seeds can be used. Alternatively, the crystalline seeds can be multi-grained such that a plurality of smaller crystals are bonded together to form each crystalline seed. Most often, when placing crystalline seeds in the catalyst layer, the crystalline seeds are preferably uncoated seeds, i.e. they do not include additional metal or other coatings around crystalline seed.

Typically, the crystalline seeds can have a diameter of from about 30 µm to about 500 µm, and preferably from about 55 µm to about 500 µm. However, the present invention is ideally suited to patterned placement and growth of almost any size crystalline seed. Allowing for larger crystalline seeds also reduces the growth time required to produce large superabrasive particles. In particular, diamond seeds suitable for use in the present invention can be larger than typical diamond seeds, i.e. from about 200 µm to about 500 µm, although the above ranges can also be effectively used. As a general guideline, typically crystalline seeds can have an average diameter from about 0.05 to about 0.2 times the average diameter of the desired grown superabrasive particles. In one detailed aspect, suitable diamond seeds can be type IIa diamond and may be synthetic or natural diamond. Alternatively, synthetic cBN or SiC seeds can be used. In an additional alternative embodiment, the crystalline seeds can be a mixture of different types of seeds, i.e. two or more of diamond seeds, cBN seeds, and SiC seeds.

Arrangement of crystalline seeds in the predetermined pattern can be accomplished in any number of ways. In one embodiment, the crystalline seeds can be arranged in predetermined pattern using a template to guide placement of the seeds. FIG. 1 shows a side view of a template 16 which can be placed upon the particulate catalyst layer 14. For improved consistency and accuracy, the template can be optionally aligned using guiding pins or the like.

Suitable templates can be formed of almost any material in which a pattern of apertures can be formed. The apertures 18 can be sized to accommodate a single crystalline seed in each aperture. The apertures are typically circular; however any other practical shape can be used. Typically, the template 16 can be formed of a metal sheet such as stainless steel, nickel, aluminum, or hard plastics. However, other materials such as polymeric, ceramic, or composite materials can also be used to form the template. In one aspect of the present invention, the template can be prepared by forming holes which extend completely through the material as shown in FIGS. 1 and 3. Alternatively, the holes can be formed only partially through the material to form a divet or indentation. The holes can be formed using any known method such as mechanical or chemical methods. Several examples can include laser drilling, micro-drilling, computer numerically controlled (CNC) drilling, chemical etching, and the like. In one aspect of the present invention, the template can be a sieve.

Figure 2A:
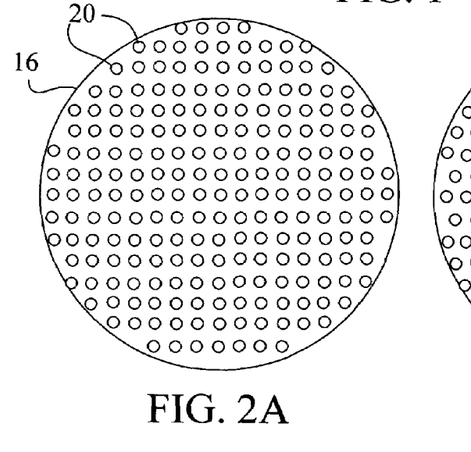
FIG. 2A is a top view of a template in accordance with an embodiment of the present invention.
Figure 2B:
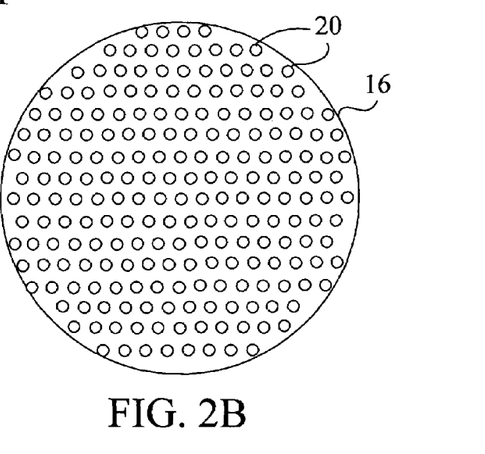
FIG. 2B is a top view of a template in accordance with another embodiment of the present invention.

The predetermined pattern can be almost any pattern which places the crystalline seeds at distances suitable for crystal growth. FIG. 2A illustrates one embodiment where the predetermined pattern can be a regular grid pattern of apertures 18 wherein crystalline seeds are placed at regular intervals in both the x and y directions. Alternatively, the predetermined pattern can be a series of offset rows as shown in FIG. 2B. In yet another alternative embodiment, the apertures 18 can be formed such that varying concentrations of crystalline seeds can be arranged or even varying sizes of crystalline seeds can be placed on the particulate catalyst layer 14 (FIG. 3). For example, predetermined patterns having variations in the size of apertures can be filled by first placing larger crystalline seeds to fill in larger apertures and then filling smaller apertures with smaller mesh crystalline seeds.

The spacing of apertures 18 in a template 16 can vary somewhat. However, the apertures should be formed such that individual crystalline seeds are placed from 400 μm to about 1 mm apart. Those skilled in the art will recognize that spacing outside this range can also be used and can depend on the size of the crystalline seeds and the desired final grown superabrasive sizes. It should be noted that these distances are measured from center to center. As additional guidance, the apertures can be formed so as to place crystalline seeds a distance apart which allows each seed sufficient space to receive raw material without competition from neighboring crystals. Depending on the desired final size of the superabrasive particles, the spacing between grown superabrasive particles can range from about 300 μm to about 1000 μm, although distances outside this range can also be used. Typically, the final diameter of the grown superabrasive particles leaves at least a distance of about 0.8 times the final diameter of the grown superabrasive particles between edges of nearby grown superabrasive particles, and preferably from about 1.2 to about 3 times the final diameter. For example, a spacing of from about 800 μm to about 900 μm can be used to grow particles having a diameter of from about 425 μm to about 600 μm (30/40 mesh). In another example, a spacing of about 650 μm can be allowed between grown superabrasive particles having a size of about 45 mesh, while a spacing of about 800 μm can be allowed for larger grown particles of about 35 mesh. Excessively large spacing between apertures can result in significant amounts of wasted space and raw materials, while an aperture spacing which places crystalline seeds too close can result in large numbers of crystals growing together. Those skilled in the art can make appropriate adjustments to spacing in order to compensate for shrinkage during HPHT growth.

Figure 4:
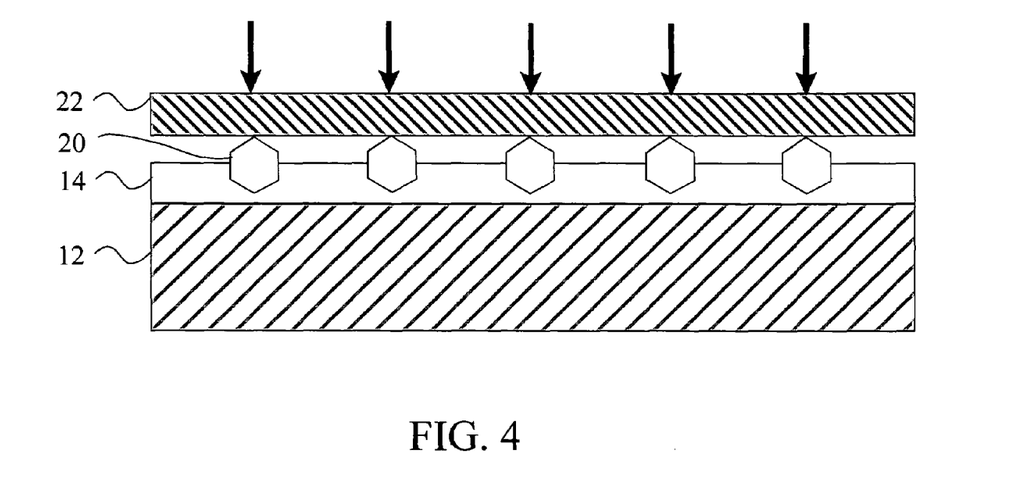
FIG. 4 is a side view of pressing the crystalline seeds into the catalyst layer in accordance with an embodiment of the present invention.

As shown in FIG. 3, crystalline seeds 20 can be placed into the apertures 18 of the template 16. An excess of crystalline seeds can be spread over the template surface such that each of the apertures is filled with a single crystalline seed. The excess crystalline seeds can be swept away or otherwise removed leaving particles placed on the particulate catalyst layer 14 as shown in FIG. 3. The template can have a thickness which varies depending on the size of the crystalline seeds and the process. Typically, the thickness of the template can be from about 0.6 to about 1.1 times the diameter of the crystalline seeds. Once the crystalline seeds are placed in the apertures of the template, the template can then be removed leaving the crystalline seeds in a predetermined pattern on the particulate catalyst layer. The template can then be reused or discarded depending on its condition. As shown in FIG. 4, a metal plate 22 or other hard surface can be used to press the crystalline seeds 20 at least partially into the particulate catalyst layer 14. Optionally, if the template has a thickness which is less than the diameter of the crystalline seeds, the template can be left in place during pressing in order to control the distance the crystalline seeds are embedded into the catalyst layer and then removed subsequently. In one embodiment of the present invention, the crystalline seeds 20 can be pressed into the catalyst layer such that from about half to about the entire particle is buried into the catalyst layer. In one aspect, crystalline seeds can be pressed completely into the catalyst layer such that each crystalline seed is substantially surrounded by catalyst material.

Figure 5:
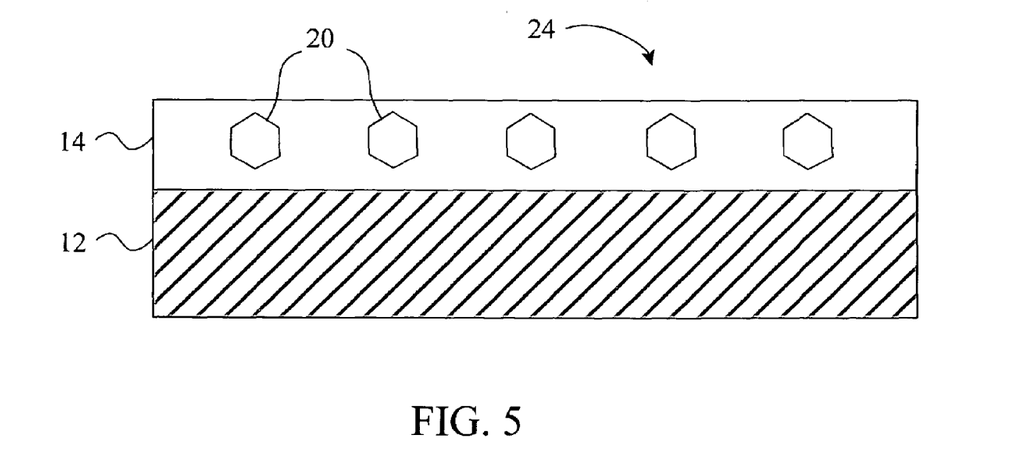
FIG. 5 is a side view of a growth precursor in accordance with an embodiment of the present invention.

In accordance with the present invention, any exposed portions of the crystalline seeds 20 can be covered with additional metal catalyst material such that the catalyst material substantially surrounds each crystalline seed to form a growth precursor 24, as shown in FIG. 5. Typically, in this embodiment of the present invention, the thickness of the initial particulate catalyst layer 14 (FIGS. 1, 3 and 4) can be from about 0.5 to about 0.9 times the diameter of the crystalline seeds, and preferably about 0.7. The exposed crystalline seeds can be covered by placing additional catalyst material on the exposed crystalline seeds and then optionally pressing to reduce porosity to less than about 33% to produce the growth precursor 24 shown in FIG. 5.

In one alternative embodiment, the exposed portions of the crystalline seeds can be covered with a metal catalyst plate or foil, although a powder metal catalyst is preferred due to some inherent non-homogeneities in solid plates. The particulate catalyst layer 14 preferably has a thickness which is sufficient to initially completely surround each crystalline seed. During crystal growth, the metal catalyst material continues to wet the surface of the crystalline seed. Therefore, the thickness of the particulate catalyst layer need not be greater than the diameter of the grown superabrasive particles.

During diamond synthesis, the graphite to metal catalyst ratio can determine the availability of raw materials for formation of diamond. Typically, the graphite to metal catalyst ratio can range from about 0.5 to about 2.0 by weight, and preferably from about 0.7 to about 1.5. In one aspect, the catalyst metal can be provided in an amount sufficient to form a layer of molten catalyst metal during growth conditions having a thickness of from about 20% to about 60% of the diameter of the diamond during growth.

Figure 6:
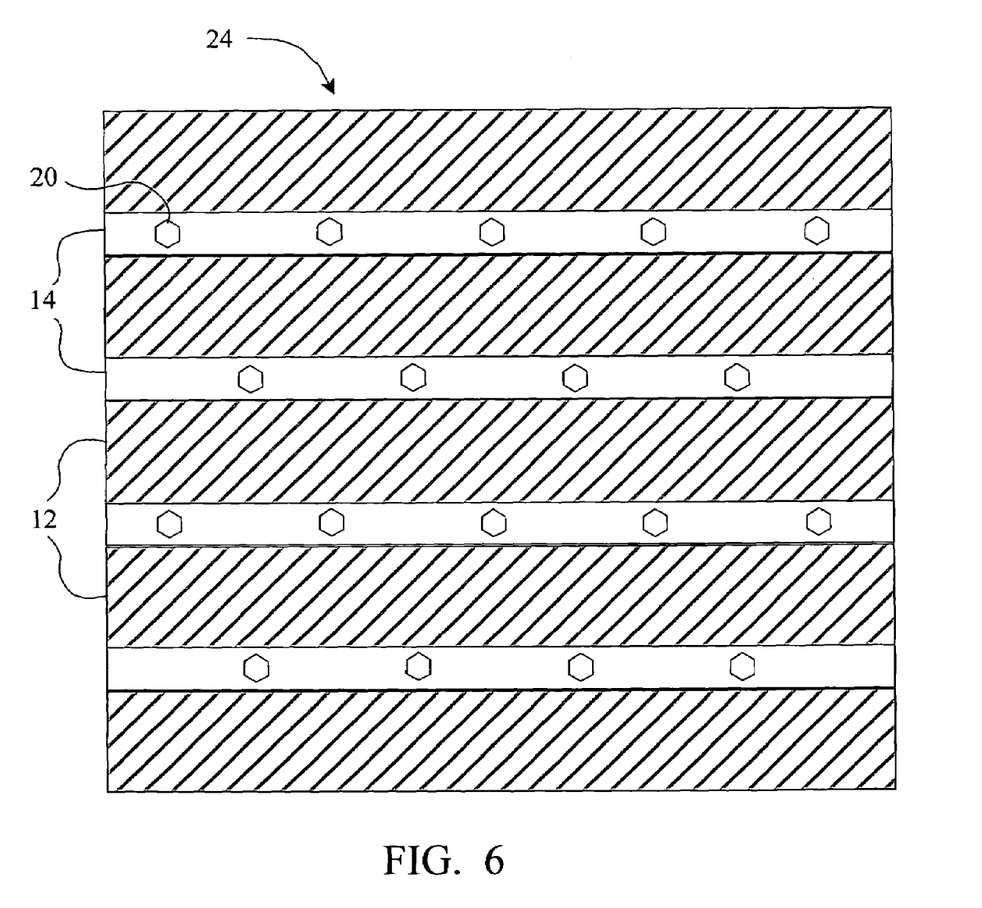
FIG. 6 is a side view of a multi-layered growth precursor in accordance with an embodiment of the present invention.

Referring now to FIG. 6, additional raw material layers 12 and particulate catalyst layers 14 can be formed to improve efficient use of a high pressure high temperature (HPHT) apparatus cell volume. The thickness of each layer can depend on the diameter of the crystalline seeds 20 and the projected diameter of the final grown superabrasive particles. Additionally, the thickness of the layers will also affect the distance between crystalline seeds in nearby catalyst layers. The predetermined pattern in each particulate catalyst layer can be configured such that upon assembling layers as in FIG. 6, the assembly also exhibits a predetermined pattern across the thickness of the growth precursor 24. The pattern shown in FIG. 6 is an offset pattern; however any suitable arrangement can be used, as long as grown crystals do not impinge on neighboring grown crystals. Typically, the particulate catalyst layers can have a thickness of from about 50 μm to about 500 μm, while the raw material layer can have a thickness of from about 70 μm to about 1 mm. Those skilled in the art will recognize that thicknesses and configurations outside of the identified ranges can also be used.

Typical HPHT reaction cells can have a reaction volume of from about 15 cm$^3$ to about 100 cm$^3$. Therefore, it is often practical to include a large number of layers in the growth precursor in order to fully utilize available reaction volume for crystal growth. In one aspect of the present invention, the growth precursor can have from about 3 to about 50 layers. In addition, formation of each layer and placement of crystalline seeds can be preceded or followed by a pressing step in order to reduce porosity and improve the cohesiveness of the growth precursor. Thus, in one preferred embodiment, each layer can be pressed prior to pressing the entire multi-layer growth precursor. Pressing can be preferably accomplished by cold isostatic pressing although other pressing techniques can also be used.

As mentioned above, the crystalline seeds can be placed in a predetermined pattern using any number of methods. Those of ordinary skill in the art will recognize a variety of ways for locating particles at desired locations on a surface or substrate. A number of techniques have been developed for placing superabrasive particles in a pattern for production of abrasive tools. For example, U.S. Pat. Nos. 2,876,086; 4,680,199; 4,925,457; 5,380,390; and 6,286,498, each of which is incorporated by reference, disclose methods of placing superabrasive particles in a pattern for forming various abrasive tools.

An alternative method for placing crystalline seeds in a predetermined pattern can include providing a transfer sheet having an adhesive layer thereon. The transfer sheet can be any material which is self-supporting and capable of transporting crystalline seeds to a catalyst layer. A template, such as those discussed above, can then be placed upon the adhesive layer. Preferably the adhesive layer is sufficiently tacky to hold the crystalline seeds which contact the adhesive while also allowing for easy removal of the template. Non-limiting examples of moderately tacky adhesives suitable for use with a transfer sheet include acrylic adhesives and polymeric adhesive microspheres, e.g., such as those used in POST-IT (trademark of 3M Company) notes. Alternatively, the template can have a surface coated with a smooth and/or non-stick material such as TEFLON or the like, in order to facilitate removal of the template. The apertures of the template can then be filled with crystalline seeds as discussed above. The template can then be removed. After removal of the template, the transfer sheet can then be placed against the catalyst layer. The transfer sheet can be oriented between the crystalline seeds and the catalyst layer. Depending on the material used, the transfer sheet may decompose during the initial stages of HPHT.

Alternatively, the transfer sheet can be oriented such that the crystalline seeds are between the transfer sheet and the particulate catalyst layer. The transfer sheet can then be removed or left in place. In order to facilitate removal of the transfer sheet without disturbing the crystalline seeds, the particles can be pressed partially into the particulate catalyst layer. Of course, the composition of the adhesive layer can also be adjusted to reduce the tackiness of the adhesive. Alternatively, the transfer sheet can be a metal catalyst foil formed of metal catalyst material used in the particulate catalyst layer. The metal catalyst foil layer can remain in place to help surround the crystalline seeds with metal catalyst material. In such an embodiment, it can be desirable to partially embed the crystalline seeds into the foil in order to avoid the use of organic binders which may adversely affect crystal growth. Regardless of the specific transfer sheet process used, the crystalline seeds can then be at least partially pressed into the particulate catalyst layer.

In yet another alternative embodiment of the present invention, the crystalline seeds can be placed in a predetermined pattern using vacuum chuck. Specifically, a vacuum chuck can be formed having a pattern of apertures therein. The apertures can be configured to hold a single crystalline seed such that pulling a vacuum through the apertures engages a single crystalline seed in each aperture. Thus, the apertures can have an initial portion sized slightly smaller than the crystalline seed and which are connected to a vacuum source. In practice, a vacuum can be pulled through the apertures and the chuck can then be placed in a supply of crystalline seeds. The chuck can then be oriented over the particulate catalyst layer, or optionally a transfer sheet and the vacuum can be reduced sufficient to release the crystalline seeds thus arranging the crystalline seeds in a predetermined pattern corresponding to the pattern of apertures in the chuck. The crystalline seeds can then be pressed at least partially into the catalyst layer in a similar manner as discussed above.

Alternatively, the crystalline seeds can be placed in a predetermined pattern on the raw material layer, rather than the catalyst layer, using any of the above-described methods, i.e. template, sieve, transfer sheet, and the like. It will be understood that any of the methods described above for placement of the crystalline seeds in a predetermined pattern can also be used on the raw material layer. Typically, diamond seeds can be coated with a catalyst metal prior to placement in the raw material layer in order to prevent direct contact of the diamond seeds with raw carbon or graphite. Coating of diamond particles is known in the industry and can be accomplished using any number of available methods. Typically, diamond particles can be coated by a catalyst metal such as Fe, Ni, Co, and alloys thereof. Catalyst coatings of nickel and nickel alloys are particularly preferred. The metal coating can help provide a molten catalyst layer surrounding the diamond seeds during HPHT growth and prevent direct contact with graphite or other carbon raw materials. The coating can have a thickness which varies from about 2 μm to about 50 μm, although thickness above this range can also be used.

Figure 7:
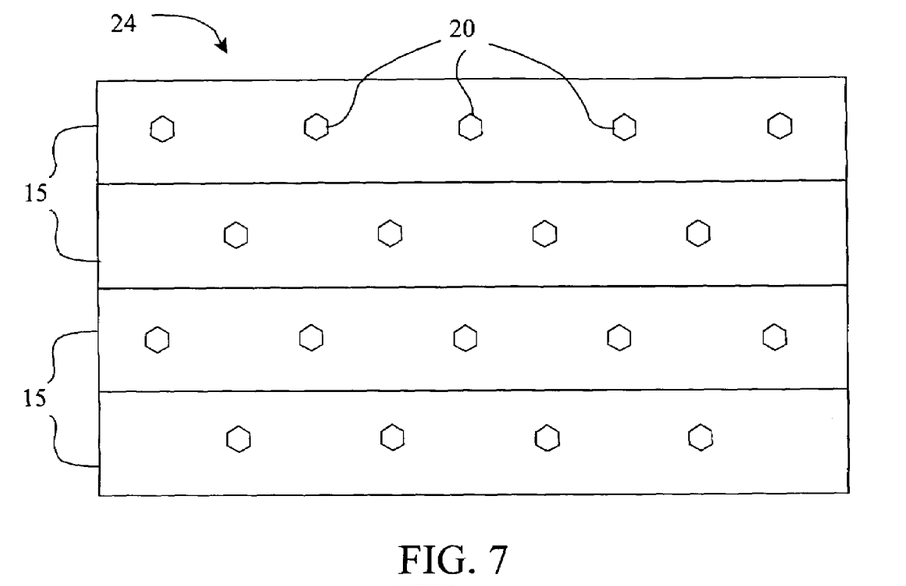
FIG. 7 is a side view of a multi-layered growth precursor in accordance with an alternative embodiment of the present invention.

In yet another alternative embodiment of the present invention, a method for controlling nucleation sites during superabrasive particle synthesis can include forming a particulate crystal growth layer. Referring now to FIG. 7, the particulate crystal growth layer 15 can be a substantially homogeneous mixture of particulate raw material and particulate catalyst material. Crystalline seeds 20 can be placed in a predetermined pattern at least partially in the particulate crystal growth layer to form a growth precursor 24 using the same methods discussed above. Additionally, the growth precursor can include a single layer or multiple layers as shown in FIG. 7. The materials, ranges, patterned placement methods, and other aspects discussed above can also be applied to the particulate crystal growth layers comprising a mixture of raw material and catalyst material. In one aspect, the particulate crystal growth layer can consist essentially of raw material and catalyst material. As mentioned earlier, an uncoated diamond seed substantially surrounded by graphite can be undesirable. However, surrounding the diamond seeds with a mixture of carbon source material and catalyst allows the catalyst powder to wet the surface of the diamond seeds and coat the surface thereof. This wetting effect is at least partially the result of carbide bonds forming between the diamond and the solvent metal. Diamond may initially dissolve because the catalyst metal is under-saturated with carbon; however, once the catalyst metal is melted, the carbon begins to diffuse into the molten catalyst. The dissolved or suspended carbon will soon adhere to the surface of the diamond seed and allow the seed to grow. Alternatively, a crystalline seed coated with catalyst metal can be used, as discussed herein.

In another optional aspect of the present invention, the growth precursor can be coated along exterior surfaces with a metal coating. Suitable metal materials can include Fe, Ni, Co, and alloys thereof. The exterior metal coating helps to prevent the precursor from adhering or bonding to reaction cell walls of the HPHT apparatus under growth conditions. The coating thickness can be any thickness which is sufficient to provide the above benefit; however, typical thicknesses can range from about 50 μm to about 300 μm. In yet another optional aspect, a layer of separator material can be included adjacent the growth precursor in a reaction cell volume of the HPHT apparatus. A layer of NaCl can typically be used as the separator material; however other materials can also be used.

Figure 8:
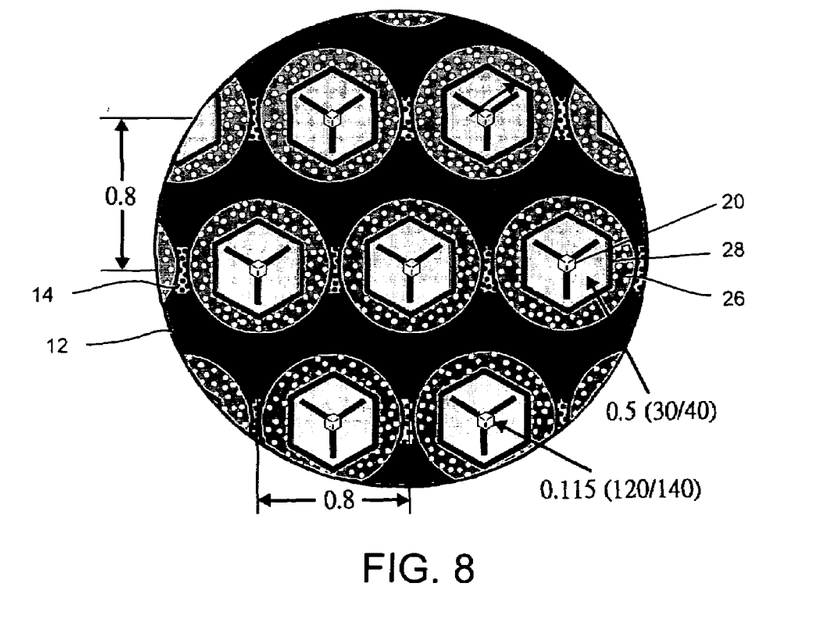
FIG. 8 shows a side view of a portion of a multi-layered assembly such as shown in FIG. 6 after HPHT processing and identifying various aspects of crystalline growth in accordance with an embodiment of the present invention.

The growth precursor can then be subjected to a temperature and pressure in which diamond or cBN is thermodynamically stable. As the temperature and pressure are increased to sufficient growth conditions, raw material such as carbon from the raw material layer migrates into the particulate catalyst layer. The catalyst material surrounding individual crystalline seeds then facilitates formation of diamond or cBN at the surface of the crystalline seeds. The growth conditions are maintained for a predetermined period of time to achieve a specific size of grown superabrasive particle. FIG. 8 illustrates the growth of diamond seeds 20 in the presence of the surrounding catalyst material 26 to form a grown diamond 28. Direct contact of diamond seeds directly with the carbon source material can cause an undesirable number of inclusions. Typical growth conditions can vary somewhat, however the temperature can be from about 1200° C. to about 1400° C. and the pressure can be from about 4 to about 7 GPa. The appropriate temperature can depend on the catalyst material chosen. As a general guideline, the temperature can be from about 10° C. to about 200° C. above a melting point of the catalyst. Growth time can typically be from about 5 minutes to about 2 hours. The patterned placement of crystalline seeds in the present invention also allows for relatively large variations in process conditions. For example, temperature and pressure can deviate from about 1% to about 10%, and in some cases can be from about 3% to about 5%. This allows for less strict control of process conditions than conventional methods, while also maintaining the quality of grown superabrasive particles. Typically, crystal growth in accordance with the present invention can be substantially epitaxial growth such that high quality superabrasive particles having high impact strength are produced. Further, the methods of the present invention can be fully automated and reduce the need for manual evaluation and processing.

Figure 11:
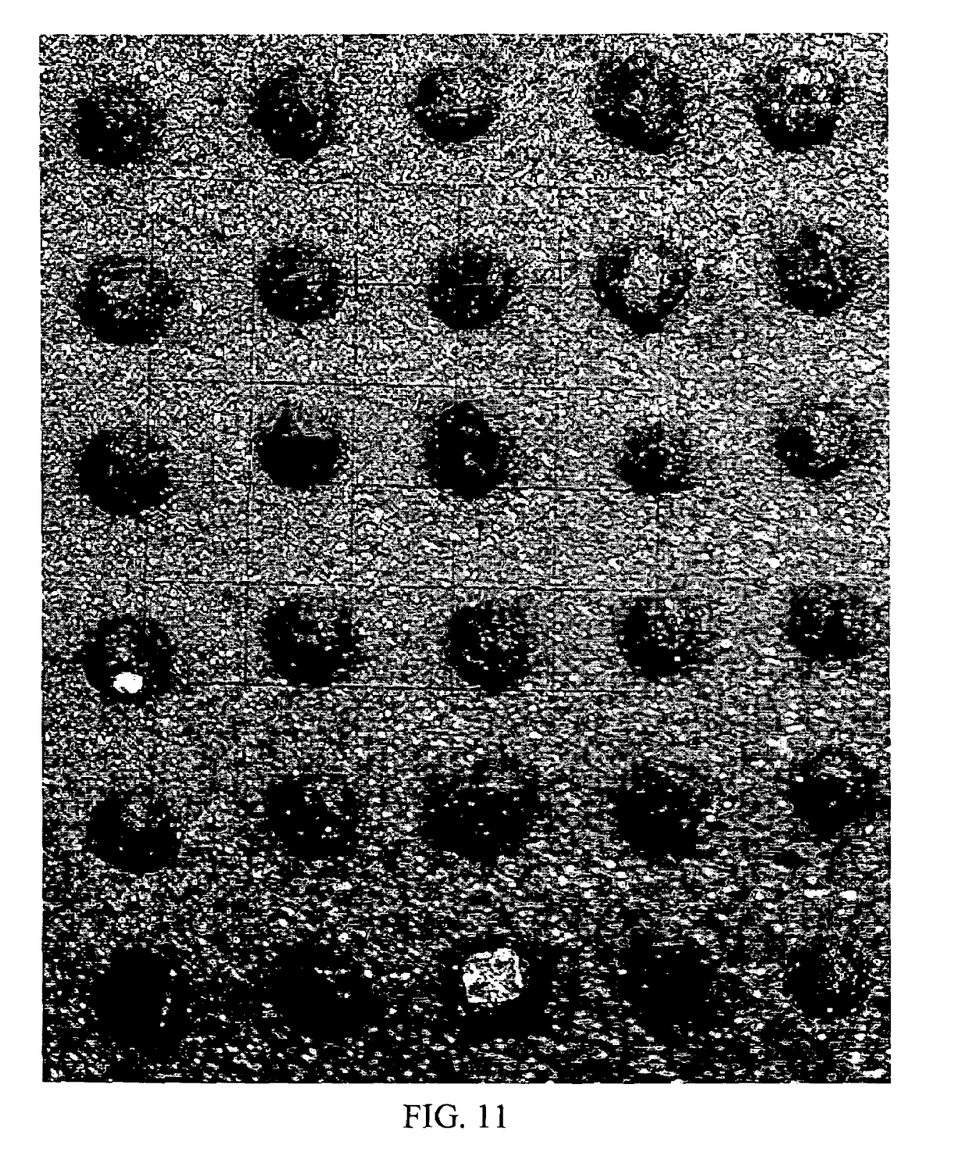
FIG. 11 is a photomicrograph of a grown diamond assembly in accordance with the present invention, which exhibits highly uniform size distribution and uniform crystal shapes.

In one detailed aspect of the present invention, the crystalline seed can be from about 10% to about 30% of the desired grown diamond particle size. Depending on the growth conditions and the size of the crystalline seed, the grown superabrasive particles can have a particle size from about 100 μm to about 2 mm. Even larger superabrasive particles can be grown if larger crystalline seeds are used. Typically, grown superabrasive particles useful in many abrasive and cutting applications can have a particle size from about 210 μm to about 1 mm. One advantage of the present invention is the uniformity of grown superabrasive particle sizes. The predetermined pattern and orientation of layers allows for substantially uniform nucleation and growth of diamond and cBN. Therefore, the grown superabrasive particles of the present invention have a very narrow size distribution and improved quality when compared to particles grown from randomly nucleated and seeded precursors. For example, the size distributions using the present invention are typically less than half the standard deviation of conventional random seeded methods. Typically, the grown superabrasive particles of the present invention also have inclusion levels which are typically not noticeable under unaided visual inspection. Typically, yields of from about 30% to about 90% conversion of carbon to diamond can be expected when using the present invention. Further, the percent of high quality diamond can range from 50% to about 90%, with over 70% being a typical yield. In some embodiments of the present invention, the yield of high quality diamonds can range from about 2 carat/cm$^3$ to about 5 carat/cm$^3$, and preferably from about 3.5 carat/cm$^3$ to about 4.5 carat/cm$^3$. FIG. 11 shows an assembly of grown diamond particles in accordance with the present invention. In FIG. 11, the diamond particles are substantially uniform in size and exhibit uniform euhedral crystal shapes. In this example, the diamond separation was predetermined at 0.9 mm.

In yet another alternative embodiment, the diamond seeds can be coated with a catalyst material. However, this is generally unnecessary if the diamond seeds are completely surrounded by catalyst material. Preferably, if a coating is used, the coating can be a catalyst material having a melting temperature within about 5° C. of the melting temperature of the catalyst material used in the particulate catalyst layer. This helps to avoid the metals from melting at significantly different times thus reducing the quality of the final grown diamond. Diamond seeds can be coated with a catalyst material using any known technique. Coating of diamond particles has historically proven difficult, since most catalyst metals cannot be easily coated on diamond to the required thickness, involve significant expense, and/or leave undesirable organic residual materials. Several examples of coating technologies include, without limitation, electroplating, chemical (e.g., electroless) deposition, physical vapor deposition (e.g., sputtering), chemical vapor deposition, fused salt coating, and the like.

EXAMPLES

The following examples illustrate exemplary embodiments of the invention. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be practical embodiments of the invention.

Example 1

A circular mold having a diameter of 46 mm was filled with powdered natural graphite having a mesh size of about 20 μm, low resistivity of about 5 μΩ, and a degree of graphitization of 0.8. The graphite was purified to be substantially free of oil, organic binders, ash, or other non-carbon materials. The graphite was cold pressed at 150 MPa to form a particulate compact disk having a thickness of 0.7 mm and a density of 2 g/cm$^3$ (12% porosity). High purity INVAR (Fe-35Ni with a mesh size of less than 40 μm) was placed on top of the graphite layer and cold pressed at 150 MPa to form a particulate catalyst layer having a thickness of 0.2 mm and a density of 6 g/cm$^3$ (less than 33% porosity). A template similar to that shown in FIG. 2B, having apertures spaced 0.8 mm apart (center-to-center) and apertures 130 μm in diameter was placed on the catalyst layer. The template was covered in uncoated diamond seeds having a mesh size of 120/140 (about 115 μm in diameter) such that the apertures were filled. The excess diamond seeds were then collected for reuse. The template was removed and a metal plate was used to press the diamond seeds into the catalyst layer such that each of the diamond seeds was about two-thirds surrounded by catalyst material. Subsequently, additional INVAR was layered over the diamond seeds. The additional catalyst material was cold pressed at 150 MPa such that the entire catalyst layer had a thickness of 0.3 mm. Seven additional layers of graphite and catalyst material were formed to produce the diamond growth precursor. Exterior surfaces of the diamond growth precursor were then coated with a 200 μm layer of iron. The diamond growth precursor was then placed in a belt apparatus. The precursor was then subjected to a pressure of about 5.2 GPa and then heated to a temperature of about 1260° C. for about one hour. The layered grown diamond assembly was then cooled and removed from the belt apparatus. The assembly was partially crushed to reveal grown diamonds which were substantially uniform. The average mesh size of the grown diamonds was 30/40. Further, the grown diamonds exhibited superior hardness, superior transparency with fully grown crystallographic faces, and very few viewable inclusions.

Example 2

A circular mold having a diameter of 46 mm was filled with powdered natural graphite having a mesh size of about 20 μm, low resistivity of about 5 μΩ, and a degree of graphitization of 0.8. The graphite was purified to be substantially free of oil, organic binders, ash, or other non-carbon materials. The graphite was mixed with high purity INVAR (Fe-35Ni with a mesh size of less than 40 μm). The weight ratio of graphite to metal catalyst was 1:1.5. The mixture was then cold pressed at 250 MPa to form a particulate compact disk having a thickness of 0.7 mm and a density of 2 g/cm$^3$ (12% porosity). A template similar to that shown in FIG. 2B, having apertures spaced 0.8 mm apart (center-to-center) and apertures 130 μm in diameter was placed on the compact disk. The template was covered in uncoated diamond seeds having a mesh size of 120/140 (about 115 μm in diameter) such that the apertures were filled. The excess diamond seeds were then collected for reuse. The template was removed and a metal plate was used to press the diamond seeds into the compact disk such that each of the diamond seeds was about two-thirds surrounded by material. Subsequently, additional graphite and INVAR powders were layered over the diamond seeds. The additional powdered material was cold pressed at 250 MPa such that the entire layer had a thickness of 0.9 mm. Seven additional layers of graphite and catalyst material each having a pattern of diamond seeds were formed to produce the diamond growth precursor. Exterior surfaces of the diamond growth precursor were then coated with a 200 μm layer of iron. The diamond growth precursor was then placed in a belt apparatus. The precursor was subjected to a pressure of about 5.2 GPa and then heated to a temperature of about 1260° C. for about 50 minutes. The layered grown diamond assembly was then cooled and removed from the belt apparatus. The assembly was partially crushed to reveal grown diamonds which were substantially uniform. The average mesh size of the grown diamonds was 30/40. Further, the grown diamonds exhibited superior hardness, superior transparency with fully grown crystallographic faces, and very few viewable inclusions.

Example 3

Graphite disks were prepared by pressing natural graphite powder having a grain size of about 20 microns into disks 37 mm in diameter and 0.8 mm in thickness at about 400 MPa. The porosity of the resulting graphite disks was about 15%. Ni coated diamond seeds (precoated diameter of about 65-75 microns) having a coated diameter of about 105-125 microns were planted into the graphite disks in a grid pattern having a pitch of about 0.8 mm to form seeded graphite disks. The seeded graphite disks were alternated with INVAR (Fe65-Ni35) disks and loaded into a steel container to make a final growth cell of 38.8 mm in diameter and 30 mm in height. One hundred of these growth cells were pressed in a 2500 ton cubic press with a ram size of 600 mm to attain a pressure of about 5.2 GPa and temperature of about 1250° C. The pressure and temperature were maintained for 50 minutes and then the pressure was reduced and the temperature gradually decreased. The pressed growth cells were broken apart to reveal diamonds having 30/40 mesh with good quality and substantially no visible defects. Most of the grown diamonds were grown from the original seeds and appeared in distinct grid patterns corresponding to the original seeded positions. The final diamond yield achieved was 4 carats/cc. This yield was significantly higher than typical commercial diamond synthesis processes providing less than 3 carats/cc.

Example 4

Same as Example 3, except that each layer was made as a mixture of raw material and catalyst material. The disks were made by blending a 1.5 to 1 ratio of INVAR powder (having a grain size of about 40 microns) and graphite powder and then pressing as before to make disks 1 mm in thickness. Ni coated diamond seeds were planted directly into the pressed disks using the same pattern template as before to form seeded disks. The seeded disks were stacked and pressed and heated to grow diamond. The results were substantially the same as Example 3.

Example 5

Same as Example 4, except the diamond seeds are uncoated, i.e. no Ni coating. The grown diamonds had poorer quality with black dots that correspond to the original position of the crystalline seeds. The crystalline seeds had substantially back-converted to carbon. This example highlights the desirability to surround diamond seeds with molten catalyst before growth begins. In this case, graphite will disperse across the molten catalyst envelope and precipitate out as diamond. If the diamond is not fully enclosed by the molten catalyst as in the case of using an uncoated seed in a mixture, the direct graphite-diamond contact will result in highly visible graphitic inclusions.

Example 6

Same as Example 3, except the powder used in the mixture was iron having a grain size of about 6 microns and cobalt having a grain size of about 2 microns in a weight ratio of 2:1. Both nickel coated and uncoated diamond seeds were used. As in other examples, the grown diamonds had a poorer quality when using uncoated diamond seeds.

Thus, there is disclosed an improved method and materials for making and growing superabrasive particles with improved quality and size distributions. The above description and examples are intended only to illustrate certain potential embodiments of this invention. It will be readily understood by those skilled in the art that the present invention is susceptible of a broad utility and applications. Many embodiments and adaptations of the present invention other than those herein described, as well as many variations, modifications and equivalent arrangements will be apparent from or reasonably suggested by the present invention and the forgoing description thereof without departing from the substance or scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. The method for controlling nucleation sites during superabrasive particle synthesis, comprising the steps of:
   a) forming a raw material layer including a raw material;
   b) forming a particulate catalyst layer adjacent the raw material layer to form a crystal growth layer, said particulate catalyst layer including a catalyst material; and
   c) placing crystalline seeds in a predetermined pattern at least partially in at least one of the catalyst layer and the raw material layer to form a growth precursor, wherein the step of placing crystalline seeds includes:
      i) placing a template having a pattern of apertures upon a surface of the crystal growth layer, each of said apertures being configured to receive a single crystalline seed;
      ii) filling the apertures of said template with the crystalline seeds; and
      iii) pressing said crystalline seeds at least partially into the crystal growth layer.

2. The method for controlling nucleation sites during superabrasive particle synthesis, comprising the steps of:
   a) forming a raw material layer including a raw material;
   b) forming a particulate catalyst layer adjacent the raw material layer to form a crystal growth layer, said particulate catalyst layer including a catalyst material; and
   c) placing crystalline seeds in a predetermined pattern at least partially in at least one of the catalyst layer and the raw material layer to form a growth precursor, wherein the step of placing crystalline seeds includes:
      i) providing a transfer sheet having an adhesive layer thereon;
      ii) placing a template having a pattern of apertures upon the adhesive layer, each of said apertures being configured to receive a single crystalline seed;
      iii) filling the apertures of said template with the crystalline seeds;
      iv) placing the transfer sheet against a surface of the crystal growth layer; and
      v) pressing said crystalline seeds at least partially into the crystal growth layer.

3. The method for controlling nucleation sites during superabrasive particle synthesis, comprising the steps of:
   a) forming a raw material layer including a raw material;
   b) forming a particulate catalyst layer adjacent the raw material layer to form a crystal growth layer, said particulate catalyst layer including a catalyst material; and
   c) placing crystalline seeds in a predetermined pattern at least partially in at least one of the catalyst layer and the raw material layer to form a growth precursor, wherein the step of placing crystalline seeds includes:
      i) providing a vacuum chuck configured with a pattern of apertures;
      ii) pulling a vacuum through the apertures and engaging a single crystalline seed in each aperture;
      iii) depositing the crystalline seeds on a surface of the crystal growth layer such that the crystalline seeds are arranged in a predetermined pattern corresponding to the pattern of apertures; and
      iv) pressing said crystalline seeds at least partially into the crystal growth layer.

4. The method of any one of claims 1, 2, or 3, wherein said catalyst layer consists essentially of catalyst material.

5. The method of any one of claims 1, 2, or 3, wherein the superabrasive particle is diamond and the raw material is a carbon source.

6. The method of claim 5, wherein said catalyst material is a member selected from the group consisting of Fe, Ni, Co, Mn, Cr, and alloys thereof.

7. The method of claim 6, wherein said catalyst material is an Fe—Ni alloy having about 65 wt % Fe and about 35 wt % Ni.

8. The method of claim 5, wherein said carbon source is graphite.

9. The method of claim 8, wherein said graphite has a degree of graphitization of greater than 0.50.

10. The method of claim 9, wherein said graphite has a degree of graphitization of from about 0.75 to about 1.

11. The method of any one of claims 1, 2, or 3, wherein the superabrasive particle is cubic boron nitride and the raw material is a hexagonal boron nitride source.

12. The method of claim 11, wherein the catalyst material is a member selected from the group consisting of alkali, alkali earth metal, and compounds thereof.

13. The method of any one of claims 1, 2, or 3, wherein the crystalline seed is a member selected from the group consisting of diamond seed, cBN seed, SiC seed, and combinations thereof.

14. The method of any one of claims 1, 2, or 3, wherein the step of placing crystalline seeds includes placing the crystalline seeds in the raw material layer and the crystalline seeds are coated with a catalyst coating.

15. The method of claim 14, wherein said raw material layer is a particulate source layer.

16. The method of claim 14, wherein said catalyst coating is a catalyst metal selected from the group consisting of iron, nickel, cobalt, and alloys thereof.

17. The method of any one of claims 1, 2, or 3, wherein the step of placing crystalline seeds include placing the crystalline seeds in the catalyst layer.

18. The method of any one of claims 1, 2, or 3, wherein the step of placing crystalline seeds substantially surrounds each crystalline seed with catalyst material.

19. The method of claim 18, wherein the step of placing crystalline seeds further comprises pressing the crystalline seeds partially into the catalyst layer and then forming a second catalyst layer on the catalyst layer such that each crystalline seed is substantially surrounded by catalyst material.

20. The method of claim 18, wherein the step of placing crystalline seeds further comprises pressing the crystalline seeds completely into the catalyst layer such that each crystalline seed is substantially surrounded by catalyst material.

21. The method of any one of claims 1, 2, or 3, further comprising the steps of repeating the steps of forming layers and placing crystalline seeds at least one additional time to form a multi-layered growth precursor.

22. The method of any one of claims 1, 2, or 3, further comprising the step of heating and pressing the growth precursor to a temperature and pressure sufficient for growth of superabrasive particles to produce grown superabrasive particles.

23. The method of claim 22, wherein the temperature is from about 1000° C. to about 1300° C. and the pressure is from about 4 to about 7 GPa.

24. The method of claim 22, wherein the temperature is from about 10° C. to about 200° C. above a melting point of the catalyst.

25. The method of claim 22, wherein said crystalline seeds have an average diameter from about 0.05 to about 0.2 times an average diameter of the grown superabrasive particles.

26. The method of any one of claims 1, 2, or 3, wherein said crystalline seeds are from about 30 μm to about 500 μm in diameter.

27. The method of any one of claims 1, 2, or 3, wherein the predetermined pattern places crystalline seeds a distance of from about 400 μm to about 900 μm apart.

28. The method of claim 27, wherein the superabrasive particles have a particle size from about 100 μm to about 2 mm.

29. The method of claim 28, wherein the superabrasive particles have a particle size from about 210 μm to about 1 mm.

* * * * *